J. W. BECK.
RIBBON HOLDER.
APPLICATION FILED JUNE 26, 1907.
909,522.
Patented Jan. 12, 1909.
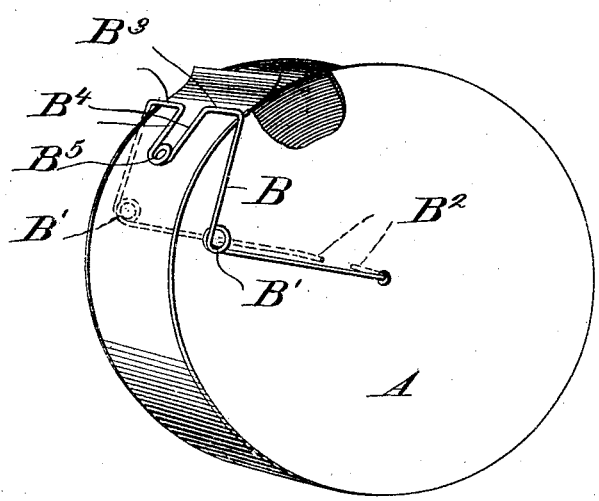
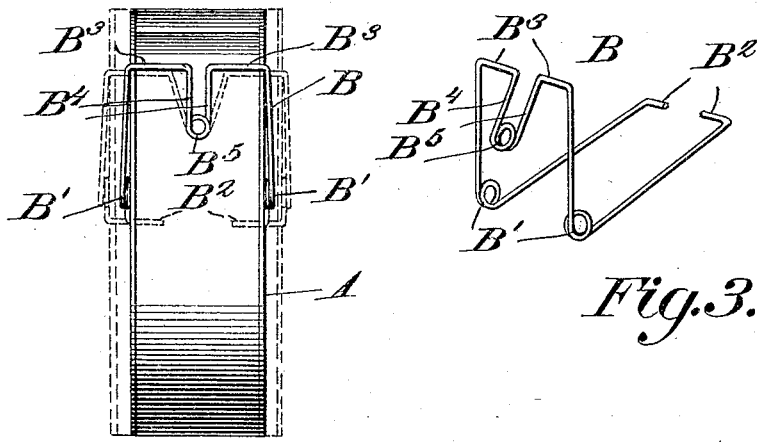
Witnesses
Phil E. Barnes
Rea P. Ebright
Inventor
J. W. Beck.
By Omrand Brock
Attorney

UNITED STATES PATENT OFFICE.

JOSEPH WARREN BECK, OF EL RITO, TERRITORY OF NEW MEXICO.

RIBBON-HOLDER.

No. 909,522.      Specification of Letters Patent.      Patented Jan. 12, 1909.

Application filed June 26, 1907. Serial No. 380,940.

*To all whom it may concern:*

Be it known that I, JOSEPH W. BECK, a citizen of the United States, residing at El Rito, in the county of Rio Arriba, New Mexico, have invented a new and useful Improvement in Ribbon-Holders, of which the following as a specification.

This invention relates to ribbon holders for spools, the object being to provide a holder which can be readily put on or taken off a spool and one which will adjust itself to fit any width spool.

Another object of my invention is to provide a holder which is very simple and cheap in construction and one which will lie flat on the spool of ribbon, so as to be out of the way when piling one or more spools upon one another.

With these and other objects in view the invention consists in the novel features of construction, combination and arrangement of parts hereinafter fully described and pointed out in the claim.

In the drawing forming a part of this specification:—Figure 1 is a perspective view of my improved holder applied to a spool of ribbon. Fig. 2 is an edge view of the same. Fig. 3 is a perspective view of my improved holder detached.

In the drawing A indicates an ordinary spool of ribbon and B my improved holder.

The holder comprises a spring wire U-shaped frame angled intermediate its ends, the side bars being coiled at their angles, as shown at $B'$ and the free ends bent inwardly to form pivots $B^2$ which are adapted to extend into the base of the spool and upon which the spool rotates. The central part of the bowed portion $B^3$ of the frame being bent downwardly and outwardly as shown at $B^4$ and coiled upon itself as shown at $B^5$. The bowed portion and depending looped portions being held into engagement with the ribbon of the spool by the coils $B'$ and the pivots being held in the base of the spool by the coiled portion $B^5$ so that the holder will adjust itself to fit any size spool.

From the foregoing description it will be readily seen that I have provided a very novel holder which will securely hold the ribbon on the spool and one which will adjust itself to the size of spool it is placed on.

Having thus fully described my invention, what I claim as new and desire to secure by Letters Patent is:—

A ribbon holder comprising a U-shaped frame angled intermediate its ends, the side bars being coiled at the angles and the free ends bent inwardly towards each other forming pivots upon which a spool is adapted to be mounted, the bowed portion of said frame being bent downwardly and outwardly and coiled upon itself, said downwardly and outwardly projecting portions being parallel with each other and adapted to engage the ribbon upon the spool.

JOSEPH WARREN BECK.

Witnesses:
JOHN H. SARGENT,
S. VAN R. WHEELER.